United States Patent [19]

Ohmori et al.

[11] 4,196,997

[45] Apr. 8, 1980

[54] INTERCHANGEABLE LENS FOR A CAMERA

[75] Inventors: Sachio Ohmori, Yokohama; Hiroshi Hasegawa; Yoshiro Kotaka, both of Tokyo, all of Japan

[73] Assignee: Nippon Kogaku K.K., Tokyo, Japan

[21] Appl. No.: 1,929

[22] Filed: Jan. 8, 1979

[30] Foreign Application Priority Data

Jan. 13, 1978 [JP] Japan .................................. 53-2464
Jan. 20, 1978 [JP] Japan .................................. 53-4445

[51] Int. Cl.² ........................ G03B 7/08; G03B 17/20; G03B 17/00
[52] U.S. Cl. ................................ 354/286; 354/23 D; 354/53; 354/60 L
[58] Field of Search ...................... 354/23, 60, 33, 35, 354/53, 286, 288, 289, 198

[56] References Cited

U.S. PATENT DOCUMENTS

| | | | |
|---|---|---|---|
| 3,846,806 | 11/1974 | Yata et al. | 354/33 X |
| 3,928,858 | 12/1975 | Sakurada et al. | 354/23 D |
| 4,063,257 | 12/1977 | Mashimo et al. | 354/60 E X |
| 4,090,207 | 5/1978 | Mashimo et al. | 354/60 L X |
| 4,112,440 | 9/1978 | Kanemaru | 354/23 D |

*Primary Examiner*—Donald A. Griffin
*Attorney, Agent, or Firm*—Fitzpatrick, Cella, Harper & Scinto

[57] ABSTRACT

In an interchangeable lens for a camera, at least three terminals are provided on the fixing cylinder of the lens. A variable diaphragm resistor exhibiting a resistance value corresponding to the diaphragm value set by the diaphragm drive ring of the lens and a variable range resistor exhibiting a resistance value corresponding to the film-to-subject distance set by the range ring of the lens are series connected between two of the terminals. A resistance value representing the guide number information is generated between the two terminals. The remaining one of the terminals is connected to the junction between the variable diaphragm resistor and the variable range resistor, and a resistance value representing the diaphragm information or the range information is generated between the remaining one terminal and the two terminals.

7 Claims, 6 Drawing Figures

INTERCHANGEABLE LENS FOR A CAMERA

BACKGROUND OF THE INVENTION

1. Field of the Invention

This invention relates to an interchangeable lens for a camera, and more particularly to an interchangeable lens which can transmitt the lens side information to the camera body side provided with a lens information discriminating device or to various accessory devices of the camera.

2. Description of the Prior Art

As an interchangeable lens of this type, there is known one in which is provided a variable resistor whose resistance value is variable in response to the movement of the diaphragm drive ring or the range ring of the lens. In such a lens, the information can only be taken out as single information and no lens is known to applicants which permits the information to be taken out synthetically as well as singly. Also, it has heretofore been practised to provide the mount of the lens with a terminal portion whereat the resistance value of the variable resistor appears and to provide the body mount of the camera with a terminal receiving portion to be opposed to the terminal portion of the lens, and to connect together the terminal portion and the terminal receiving portion by the coupling operation of the lens and the camera body, thereby accomplishing electrical connection therebetween.

This has resulted in a disadvantage in that where a lens capable of generating information is combined with a camera which does not have the function of receiving such information, no transmission of the information can take place therebetween.

SUMMARY OF THE INVENTION

It is an object of the present invention to provide an interchangeable lens which permits the lens side information to be taken out singly and synthetically.

It is another object of the present invention to provide an interchangeable lens which permits the lens side information to be taken out from another place than the lens mount, whereby even a camera having no terminal receiving portion on the body mount portion can receive the lens side information.

It is still another object of the present invention to provide a lens information discriminating device which discriminates between the diaphragm and the range informations incorporated in an interchangeable lens and thereby cooperates with the interchangeable lens to permit other information to be also taken out.

The invention will become more fully apparent from the following detailed description thereof taken in conjunction with the accompanying drawings.

DESCRIPTION OF THE PREFERRED EMBODIMENTS

Figure 1:
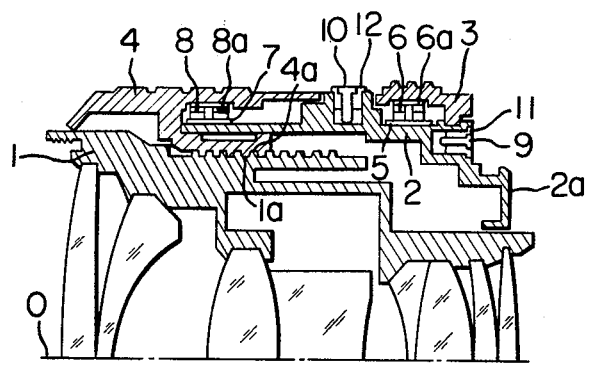
FIG. 1 is a cross-sectional view of the interchangeable lens according to an embodiment of the present invention.

FIG. 1 shows a cross-section of an interchangeable lens according to the present invention. A lens tube 1 is supported for movement in the direction of an optic axis O by a fixing cylinder 2. Lenses are supported by the lens tube 1. The lens tube 1 is provided with a helicoid portion 1a. A diaphragm drive ring 3 is rotatably supported by the fixing cylinder 2 and the rotation of the ring 3 selects a diaphragm value. A brush 6 is secured to the ring 3 with an insulating plate 6a interposed therebetween. A diaphragm resistance band 5 is opposed to the brush 6 and attached to the fixing cylinder 2, and these are in contact with each other. The brush 6 and the resistance band 5 together constitute a variable resistor whose resistance value is variable in accordance with the diaphragm value or rotation of the diaphragm drive ring 3. A range ring 4 is rotatably supported by the fixing cylinder 2 and is provided with a helicoid portion 4a meshing with the helicoid portion 1a of the lens tube 1. Thus, the rotation of the range ring 4 is transmitted to the lens tube 1 by the helicoid portions 1a and 4a, whereby the lens tube 1 is moved in the direction of the optic axis for focusing.

A brush 8 is secured to the range ring 4 with an insulating plate 8a interposed therebetween. A range resistance band 7 is opposed to the brush 8 and attached to the fixing cylinder 2, and these are in contact with each other. The brush 8 and the resistance band 7 together constitute a variable resistor whose resistance value is variable in accordance with the rotation of the range ring 4, namely, the distance to the subject to be photographed.

The fixing cylinder 2 has a mount portion 2a (lens mount) which is provided with mount portion terminals 9 insulated from the fixing cylinder 2 by an insulating cylinder 11 (only one such terminal is shown, but actually a plurality of such terminals are provided). Further, external terminals 10 insulated from the fixing cylinder 2 by an insulating cylinder 12 are provided on the outer peripheral surface of the fixing cylinder 2 (only one such terminal is shown, but actually a plurality of such terminals are prepared corresponding to a plurality of the mount portion terminals).

The connection among the variable resistor, the mount portion terminals 9 and the external terminals 10 will hereinafter be described.

Figure 2:
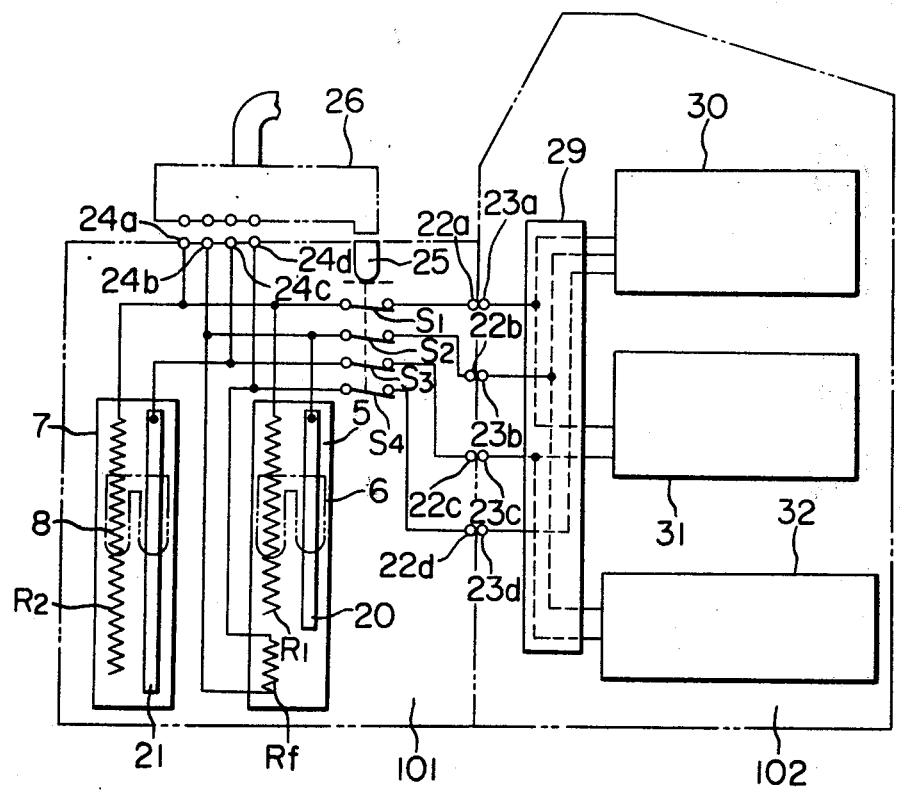
FIG. 2 illustrates the electrical connections between the interchangeable lens shown in FIG. 1 and the camera body side.

FIG. 2 shows the electrical connection of the interchangeable lens shown in FIG. 1 and the electrical connection between the interchangeable lens and the camera body side.

Designated by 5 is the already described diaphragm resistance band, and R1 symbolically denotes the resistance thereof. A conductive portion 20 is provided on the resistance band 5, and the above-described brush 6 extends between the resistance band 5 and the conductive portion 20. Denoted by 7 is the above-described range resistance band, and R2 symbolically denotes the resistance thereof. A conductive portion 21 is provided on the resistance band 7, and the aforementioned brush 8 extends between the resistance band 7 and the conductive portion 21.

Terminals 22a–22d correspond to the above-described mount portion terminals 9 provided on the lens mount and are respectively coupled with terminals 23a–23d of the terminal receiving portion of the camera upon mounting operation of the lens to the camera body. The terminal 22a is connected to the terminal 22b through a switch $S_1$, the resistor $R_1$, the brush 6, the conductive portion 20 and a switch $S_2$. The resistance value between these terminals corresponds to the amount of rotation of the diaphragm drive ring 3, namely, the diaphragm value. The terminal 22a is also connected to the terminal 22c through the switch $S_1$, the resistor $R_2$, the brush 8, the conductive portion 21 and a switch $S_3$. The resistance value between these terminals corresponds to the amount of rotation of the range ring 4, namely, the film-to-subject distance. The terminal 22b is connected to the terminal 22d through the switch $S_2$, an open F-value resistor $R_f$ of each lens and a switch $S_4$. The resistance value between these terminals represents the open F-value peculiar to each lens. Further, the terminal 22c is connected to the terminal 22b through the switch $S_3$, the conductive portion 21, the brush 8, the resistor $R_2$, the resistor $R_1$, the brush 6, the conductive portion 20 and the switch $S_2$. The resistance between these terminals corresponds to the combined resistance value of the film-to-subject distance and the diaphragm value, namely, the guide number.

Here, in order that the combined resistance value of the resistors $R_1$ and $R_2$ may represent the exposure guide numbers, it is necessary to determine the patterns of the resistance bands 5 and 7 or to determine the operative association between the diaphragm drive ring 3 and the brush 6 and between the range ring 4 and the brush 8 respectively so that the resistor $R_1$ is varied in proportion to the logarithm of the diaphragm value and that the resistor $R_2$ is varied in proportion to the logarithm of the film-to-subject distance. As is well-known, what has been described above may be accomplished by rendering the pattern of the resistance bands 5, 7 logarithmic and connecting the diaphragm drive ring 3 and the range ring 4 to the brushes 6 and 8 or by rendering the pattern of the resistance bands 5 and 7 uniform and interposing a logarithmic transformation cam between the diaphragm drive ring 3 and the brush 6 and between the range ring 4 and the brush 8.

Terminals 24a–24d correspond to the previously described external terminals 10 and are respectively parallel-connected to the terminals 22a–22d through the switches $S_1$–$S_4$. There is obtained a resistance value corresponding to the diaphragm value between the terminals 24a and 24b, a resistance value corresponding to the film-to-subject distance between the terminals 24a and 24c, a resistance value corresponding to the open F-value between the terminals 24b and 24d, and a resistance value corresponding to the guide number between the terminals 24c and 24b.

A change-over member 25 controls ON and OFF of switches $S_1$–$S_4$ and, when an external terminal receiving portion 26 is mounted to the lens, the change-over member is depressed downwardly in response thereto as viewed in the drawing, to thereby open the switches $S_1$–$S_4$. Accordingly, the aforementioned resistance values are provided from the terminals 24a–24d through the external terminal receiving portion 26. The usage of the external terminal receiving portion 26 will hereinafter be described. On the other hand, removal of the external terminal receiving portion 26 from the lens closes the switches $S_1$–$S_4$. Reference numeral 101 designates an interchangeable lens body, 102 a camera body, and 29 a discriminating portion which will later be described.

Figure 3:
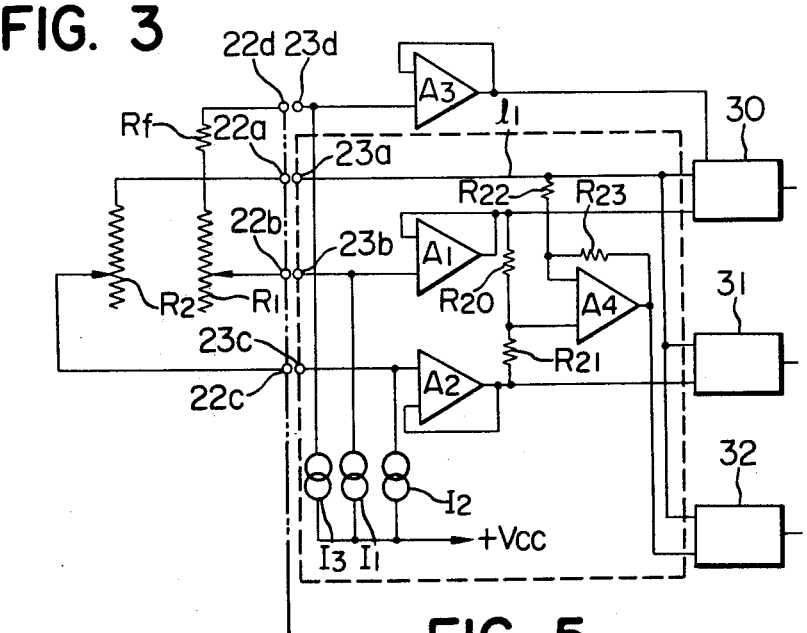
FIG. 3 illustrates an example of the circuit of the discriminating portion shown in FIG. 2.

FIG. 3 shows an example of the circuit of the discriminating portion 29 shown in FIG. 2. This discriminating portion 29 connects a required resistance to an exposure control device 30, a focusing display device 31 and a TTL dimmer device 32. A constant current source I1 flows electric current to the diaphragm variable resistor $R_1$. This causes the resistor $R_1$ to generate a voltage corresponding to the diaphragm value. A constant current source I2 flows electric current to the range variable resistor $R_2$. This causes the resistor $R_2$ to generate a voltage corresponding to the film-to-subject distance. A constant current source I3 flows electric current to the open F-value resistor $R_f$. This causes the resistor $R_f$ to generate a voltage corresponding to the open F-value. A line $l_1$ is a common earth line.

A voltage follower $A_1$ applies to the exposure control device 30 the voltage generated across the resistor $R_1$. A voltage follower $A_3$ applies to the exposure control device 30 the voltage generated across the resistor $R_f$. Accordingly, the exposure control device 30 can automatically control the shutter speed to effect exposure control, as is well-known.

A voltage follower $A_2$ applies to the focusing display device 31 the voltage generated across the resistor $R_2$. By this, when the focusing is effected, an LED or the like is turned on to indicate the focusing. Of course, in this case, is required a well-known focusing detecting device (not shown) which determines the focusing distance by the use of the brightest subject out of major subjects, for example, or the subject positioned centrally of the finder in accordance with the triangulation method.

An operational amplifier $A_4$ constitutes an adder together with resistors $R_{20}$–$R_{23}$ and applies to the TTL dimmer device 32 a voltage resulting from the addition of the output voltages of the voltage followers $A_1$ and $A_2$, and accordingly, a voltage corresponding to the guide number. Thus, it can display in the well-known manner whether the diaphragm value and the film-to-subject distance are combined beyond the dimming range during the automatic dimming.

In the circuit arrangement described above, it is required to adjust the dimensions of the output voltages of the voltage followers $A_1$, $A_2$ and $A_3$ to the other information voltages applied to these devices 30, 31 and 32 as by logarithmically expanding the output voltages of the voltage followers $A_1$, $A_2$ and $A_3$.

The resistors $R_1$ and $R_2$ need not be logarithmically varied, as already noted. In that case, it is advisable to logarithmically compress the output voltages of the voltage followers $A_1$ and $A_2$ by means of semiconductor elements such as diodes or the like. By doing so, the output of the adder can still remain to correspond to the guide number.

The following becomes possible according to the above-described interchangeable lens and discriminating portion. In FIG. 3, (1) if the resistance value between the terminals 22a and 22b, namely, the diaphragm value information, and the resistance value between the terminals 22b and 22d, namely, the open F-value information are transmitted to the exposure control device 30 of the camera as the diaphragm information, the automatic exposure control may be accomplished as is well-known.

(2) If the resistance value between the terminals 22a and 22c is transmitted to the focusing display device 31 as the range information, the fact of focusing, which has heretofore been accomplished by a split prism or the like, may be known by means of a display device such as an LED or the like.

(3) If the resistance value between the terminals 22b and 22c, namely, the guide number information is transmitted to the TTL dimmer device 32 as the speed light information, whether the diaphragm value and the film-to-subject distance are combined beyond the dimming range during the automatic dimming may be displayed. In this case, the light-emitting portion of the speed light may be either of the built-in type or the attachment type.

Figure 4:
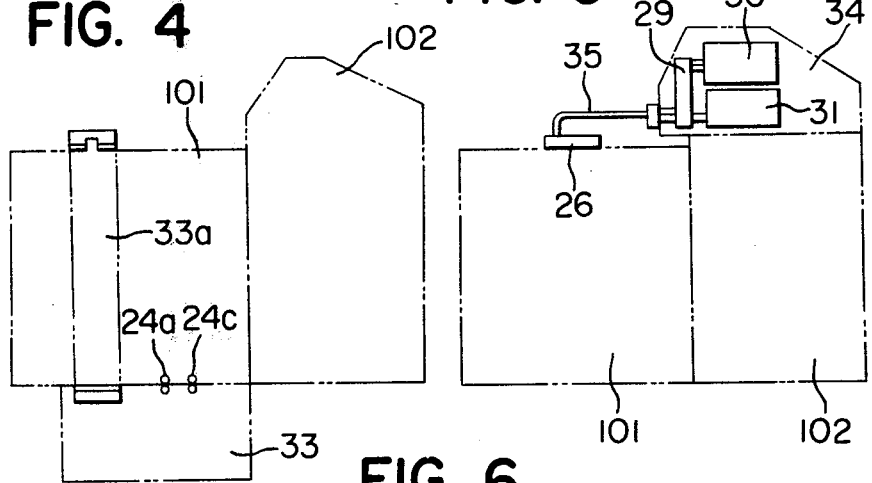
FIG. 4 illustrates the connection between the interchangeable lens having an automatic focusing device mounted thereon and the camera body.

In FIG. 4, an automatically focusing device 33 is mounted around the lens. In this case, the range ring 4 of the lens is connected to the coupled-range ring 33a of the automatic focusing device 33 and the automatic focusing is effected in the well-known manner. In this case, the range information on the lens side is obtained from across the terminals 24a and 24c of the external terminal 10. Also, at this time, the change-over member 25 opens the switches $S_1$-$S_4$ upon mounting operation of the focusing device 33 to the lens. By this, it is possible, for example, to prevent waste of the power or malfunctioning of the automatically focusing device 33 which would otherwise result from electric current's inadvertently flowing from the exposure control device 30 or the focusing display device 31 to the resistor $R_1$ or $R_2$.

Figure 5:
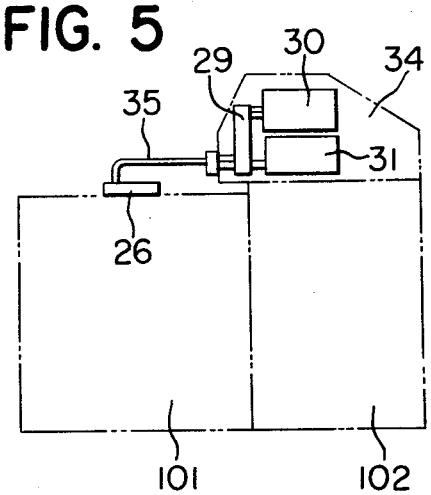
FIG. 5 illustrates the case of the camera body which is not provided with the terminal for receiving the information from the lens side.

In FIG. 5, the mount of the camera body is not particularly provided with a terminal for receiving the information from the lens side. In such a camera, the finder portion may be replaced by another finder portion 34 having mounted thereon the aforementioned exposure control device 30 or focusing display device 31. This finder portion 34 may be connected to the external terminal 10 of the lens by means of a connector cord 35. The operation thereof is such as already described and need not be explained further.

Figure 6:
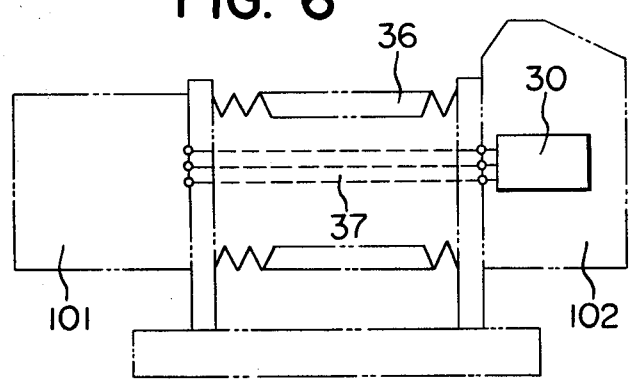
FIG. 6 illustrates the case where photography is effected by the use of bellows.

FIG. 6 shows the case where photographing is effected by the use of bellows. Heretofore, exposure setting at stopping down has been effected in the case of bellows or the like and this holds true even of what is known as auto-bellows. This is because the diaphragm value and open F-value of the lens cannot be transmitted to the camera side. Therefore, the user follows the procedure of once effecting exposure setting at stopping down and thereafter effecting photography with the diaphragm of the lens open. This has been very inconvenient. On the other hand, if the above-described interchangeable lens is mounted to the bellows 36 and a cord 37 for connecting the camera with the lens is provided to the bellows, the exposure setting at maximum aperture becomes possible and this is convenient. Designated by 30 is the exposure control device.

Thus, according to the present invention, it is possible electrically to take out the information of the lens side either singly or synthetically.

Also, the external terminal provided on the outer periphery of the lens enables the information therefrom to be received even by a camera which does not have the electrical connection portion to be coupled to the mount portion of the interchangeable lens or an accessory device. It will be apparent to those skilled in the art that various other modifications and variations in addition to those mentioned above could be made in the apparatus of the invention without departing from the scope and spirit of the invention.

We claim:
1. An interchangeable lens for a camera including
   (1) at least three terminals provided on a fixing cylinder of said lens,
   (2) a variable diaphragm resistor and a variable range resistor series-connected between two of said terminals, said variable diaphragm resistor providing a resistance value corresponding to a diaphragm value set by a diaphragm drive ring of said lens, said variable range resistor providing a resistance value corresponding to a film-to-subject distance set by a range ring of said lens, and remaining one of said terminals being connected to a junction between said variable diaphragm resistor and said variable range resistor, and
   (3) whereby a resistance value representing exposure guide number information is generated between said two of said terminals, and resistance values respectively representing diaphragm value information and film-to-subject distance information are generated between said remaining one of said terminals and said two of said terminals respectively.

2. An interchangeable lens according to claim 1 wherein more than three said terminals are provided and a resistor representing an open F-value is connected between another remaining one of said terminals and the junction between said variable diaphragm resistor and said variable range resistor.

3. An interchangeable lens according to claim 1 or 2, wherein said terminals are mount portion terminals provided on a mount portion of said lens for connection to connecting terminals provided on a mount portion of said camera.

4. An interchangeable lens according to claim 3, wherein external terminals respectively parallel-connected to said mount portion terminals are provided on outer periphery of said lens.

5. An interchangeable lens according to claim 4, further including change-over switches provided between said mount portion terminals and the junctions between said mount portion terminals and said external terminals, said switches being opened when an external terminal receiving portion for coupling to said external terminals are mounted on said lens.

6. A interchangeable lens according to claim 1 or 2, wherein said terminals may be used for connection to a lens information discriminating device including means for flowing current to said variable diaphragm resistor and said variable range resistor, means for putting out voltage generated across said variable diaphragm resistor as the diaphragm value information, means for putting out voltage generated across said variable range resistor as the film-to-subject information, and means for adding together said output voltages of said variable diaphragm and range resistors and putting out the guide number information.

7. An interchangeable lens according to claim 1, wherein said variable diaphragm resistor is varied in proportion to the logarithm of the diaphragm value set by the diaphragm drive ring and said variable range resistor is varied in proportion to the logarithm of the film-to-subject distance set by the range ring.

* * * * *